(12) United States Patent
Wetzel et al.

(10) Patent No.: US 9,048,588 B2
(45) Date of Patent: Jun. 2, 2015

(54) CONNECTING APPARATUS FOR TRANSMITTING HIGH-VOLTAGE CURRENT IN THE MOTOR VEHICLE SECTOR

(71) Applicants: Dr. Ing. h.c. F. Porsche Aktiengesellschaft, Stuttgart (DE); Rosenberger Hochfrequenztechnik GmbH & Co., Tittmoning (DE)

(72) Inventors: Timo Wetzel, Bad Rappenau (DE); Christian Eckart, Vachendorf (DE); Willem Blakborn, Inzell (DE); Helmut Muehlfellner, Kirchanschoering (DE)

(73) Assignees: Dr. Ing. h.c. F. Porsche Aktiengesellschaft (DE); Rosenberger Hochfrequenztechnik GmbH & Co., KG (DE)

( * ) Notice: Subject to any disclaimer, the term of this patent is extended or adjusted under 35 U.S.C. 154(b) by 43 days.

(21) Appl. No.: 14/064,833

(22) Filed: Oct. 28, 2013

(65) Prior Publication Data
US 2014/0120768 A1    May 1, 2014

(30) Foreign Application Priority Data

Oct. 26, 2012   (DE) .......................... 10 2012 110 232

(51) Int. Cl.
*H01R 24/40* (2011.01)
*H01R 13/658* (2011.01)
(Continued)

(52) U.S. Cl.
CPC .......... *H01R 13/6581* (2013.01); *Y02T 10/6204* (2013.01); *Y02T 10/6282* (2013.01); *H01R 13/53* (2013.01); *H01R 13/6485* (2013.01); *H01R 2201/26* (2013.01)

(58) Field of Classification Search
CPC .... H01R 24/40; H01R 9/0518; H01R 9/0521; H01R 13/658; H01R 9/032
See application file for complete search history.

(56) References Cited

U.S. PATENT DOCUMENTS 3,826,860 A * 7/1974 De Sio et al. ................ 174/73.1
4,044,208 A   8/1977 McDonald et al.
(Continued)

FOREIGN PATENT DOCUMENTS

DE           3883564       10/1994
DE      10 2007 038 990    2/2009
(Continued)

OTHER PUBLICATIONS

German Patent Application No. 10 2012 110 232-Search Report dated Jul. 11, 2013 Japanese Patent Application No. 2013-221707—Office Action dated Oct. 9, 2014.

*Primary Examiner* — Gary Paumen
(74) *Attorney, Agent, or Firm* — Gerald E. Hespos; Michael J. Porco; Matthew T. Hespos

(57) ABSTRACT

A connecting apparatus for transmitting high-voltage current in a motor vehicle has a first connection element (4), a second connection element (6), a shielding housing (12) and fasteners (8, 10). The first connection element (4) has a housing (20) having a first insulating housing (21), a first contact (18) connected electrically to an internal conductor (16) of a cable (14), and a shielding arrangement (28) connected to a shield (30) of the cable (14). The shielding arrangement (28) is connected to the shielding housing (12) by a shielding part (32). The second connection element (6) has a second housing (41) having a second insulating housing part (42) with a second contact element (46) connected to a current line element. A weak-current contact arrangement creates a control circuit, and has a ring contact (52) and two spring contacts (60, 62).

10 Claims, 2 Drawing Sheets

(51) Int. Cl.
  *H01R 13/6581* (2011.01)
  *H01R 13/53* (2006.01)
  *H01R 13/648* (2006.01)

(56) References Cited

U.S. PATENT DOCUMENTS

| | | | |
|---|---|---|---|
| 4,297,561 A * | 10/1981 | Townsend et al. | 219/137.63 |
| 4,591,226 A * | 5/1986 | Hargett et al. | 439/192 |
| 5,138,986 A * | 8/1992 | Aguilar | 123/179.3 |
| 5,637,977 A | 6/1997 | Saito et al. | |
| 2010/0289499 A1 | 11/2010 | Bremmer et al. | |
| 2011/0171849 A1 | 7/2011 | Houir | |
| 2012/0074954 A1 | 3/2012 | Jaeger et al. | |
| 2012/0264321 A1 * | 10/2012 | Siebens et al. | 439/296 |
| 2013/0323954 A1 | 12/2013 | Eckel et al. | |

FOREIGN PATENT DOCUMENTS

| | | |
|---|---|---|
| GB | 2223134 | 3/1990 |
| JP | 60-220036 | 11/1985 |
| JP | 10-012327 | 1/1998 |
| JP | 2001-357940 | 12/2001 |
| JP | 2008-176965 | 7/2008 |
| JP | 2009-043704 | 2/2009 |
| JP | 2012-049013 | 8/2012 |
| WO | 2010015889 | 2/2010 |

* cited by examiner

CONNECTING APPARATUS FOR TRANSMITTING HIGH-VOLTAGE CURRENT IN THE MOTOR VEHICLE SECTOR

CROSS REFERENCE TO RELATED APPLICATION

This application claims priority under 35 USC 119 to German Patent Appl. No. 10 2012 119 232.5 filed on Oct. 26, 2012, the entire disclosure of which is incorporated herein by reference.

BACKGROUND

1. Field of the Invention

The invention relates to a connecting apparatus for transmitting high-voltage current in the motor vehicle sector, comprising at least one first connection element, at least one second connection element, at least one shielding housing part and fixing means, wherein the first connection element has at least one housing arrangement having a first insulating housing part with at least one first contact element, which is electrically connected to an internal conductor of a cable, and has a shielding arrangement which is connected to a shield of the cable, wherein the shielding arrangement is connected to the shielding housing part by means of a shielding part, wherein the second connection element has at least one second housing arrangement having a second insulating housing part with at least one second contact element, which is connected to a current line element, and wherein a weak-current contact arrangement for creating a control current circuit is provided.

2. Description of the Related Art

A large number of connecting apparatuses for transmitting current and/or high-voltage current are known from the fields of electrical engineering and electronics. High-voltage current is also playing an ever more important role in the motor vehicle sector owing to the development of hybrid, electric and fuel cell vehicles. It is therefore necessary to take specific protective measures to prevent direct and indirect contact with active live parts for a voltage supply system of this kind. DE 10 2007 038 990 A1 therefore discloses providing a monitoring system which has a low-voltage circuit which is called a pilot line or interlock line. The voltage supply system is enabled for connection only when this low-voltage circuit is closed, and this is registered by a control element. In this case, the low-voltage circuit is closed, in particular, by contact plug elements which are known per se. Furthermore, latching means which are intended to ensure reliable latching between the connection elements which are to be connected to one another are also known. It should be clear that, in particular, the provision of a control circuit and the connection by means of latching means requires a high level of expenditure on fitting, wherein the connection elements which are to be connected are to be arranged with precise orientation in relation to one another. This is disadvantageous, particularly in the automobile industry which is characterized by automated manufacturing processes, and results in a high level of costs.

Therefore, the object of the present invention is to improve a connecting apparatus for transmitting high-voltage current in the motor vehicle sector to the effect that the prespecified protective measures are taken into consideration and production is cost-effective, in spite of simplified fitting.

SUMMARY OF THE INVENTION

This object is achieved in that the weak-current contact arrangement has a ring contact element and two spring contact elements. In this way, the contact elements of the control circuit no longer have to be precisely oriented in relation to one another, this considerably simplifying fitting. A particularly advantageous embodiment is produced by the ring contact element being inserted into a shock protection means at a radial distance d from the outside diameter of the shock protection means. Firstly, a first connection element, which is particularly simple to produce, for the connecting apparatus is provided as a result, and secondly latching between the two connecting elements of the connecting apparatus can be ensured in this way at the same time. In order to ensure even more precise latching of the spring contact elements in the ring contact element, it is advantageous when the ring contact element has a groove.

The respective spring contact element advantageously has a contact zone which is directed in the direction of the ring contact element, in order to establish defined contact.

The first insulating housing part can advantageously be produced from plastic and can be connected to the shielding housing part by means of removable fixing means, such as screws for example. In the same way, the second insulating housing part can also be produced from plastic and can be connected to the shielding housing part by means of removable fixing means, such as screws for example.

In order to make fitting even simpler, it is advantageous when the first contact element is in the form of a socket, and the second contact element is in the form of a pin. In this case, the first contact element can have a current spring element in order to provide a secure contact-connection.

The spring contact element is particularly advantageously arranged in a housing part in a displaceable manner in such a way that the spring contact element is arranged so as to be recessed in relation to a housing surface in the non-fitted state, and is arranged so as to project in relation to the housing surface in the fitted state. This ensures that the spring contact element is moved into the contact position only in the fitted state, as a result of which it is protected from the environment in the non-fitted state.

In order to ensure that there is sufficient contact between the first and the second contact element, before the weak circuit is closed, the distance between the first and the second contact element is at least 1 mm less than the distance between the ring contact element and the two spring contact elements.

The invention will be described in greater detail below with reference to the drawings.

DETAILED DESCRIPTION OF THE PREFERRED EMBODIMENTS

Figure 1:
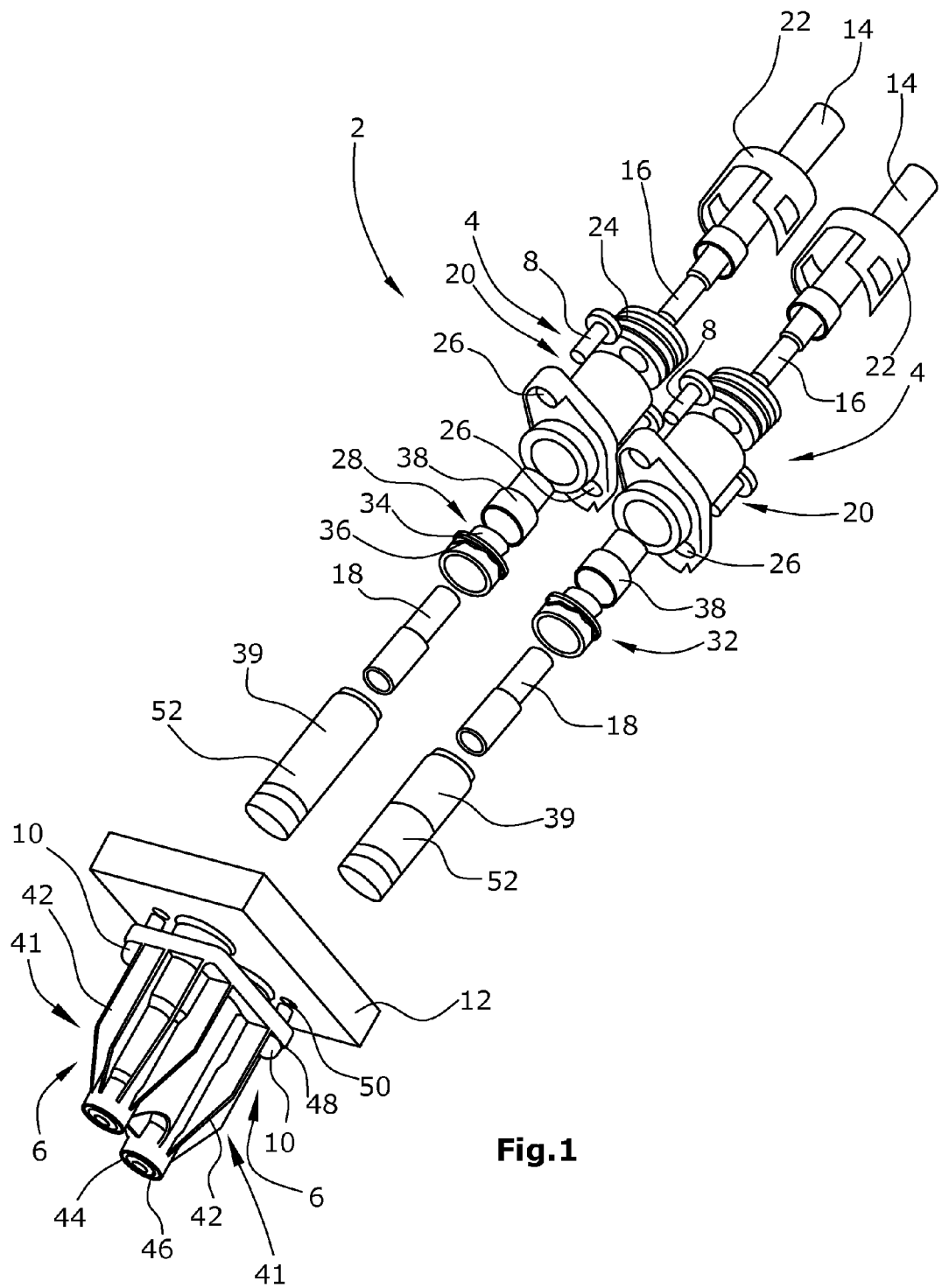
FIG. 1 shows an exploded perspective view of a connecting apparatus according to the invention.

FIG. 1 shows an exploded perspective view of a connecting apparatus 2 according to the invention for transmitting high-voltage current in the motor vehicle sector. In the present exemplary embodiment, the connecting apparatus 2 is designed as a plug connection in the form of a pin-and-socket connection, but it should be made clear that other types of connection are also possible within the scope of the invention. Furthermore, FIG. 1 shows a connecting apparatus 2 which has in each case two first connection elements 4 and two second connection elements 6 which engage one in the other and are fixed to a shielding housing part 12 by means of fixing means 8, 10 which are designed as screws in this case.

The first connection element 4 is connected to a high-voltage current cable 14 in this case. To this end, an internal conductor 16 is connected to a first contact element 18, wherein the first contact element 18 is designed as a socket-like round contact. Furthermore, the first connection element 4 has a first insulating housing part 20 which has, as is known, a cap element 22 and a sealing element 24 on that side which is directed toward the cable 14. In the present exemplary embodiment, the first insulating housing part 20, which is produced from plastic, has holes 26 through which the screws 8 can pass in order to engage with corresponding threaded holes in the shielding housing part 12. A shielding arrangement 28 which is connected to a shield 30 (see FIG. 2 in this respect) is also provided. In the present exemplary embodiment, the shielding arrangement 28 has a shielding part 32 which is designed, according to the invention, as a shielding sleeve 34 with a sprung contact element 36. As a result, the shielding sleeve 34 always rests against the shielding housing part 12 under prestress and thereby ensures optimum shielding together with optional functional reliability since the connection arrangement 4 is also held under prestress in this way. A crimping sleeve 38 completes the shielding arrangement 28 and substantially ensures shielding crimping of the cable. The first contact element 18 is further provided with a shock protection means 39 which can be of different colors in order to prevent connection errors during fitting in this way by means of coding. Furthermore, the first insulating housing part 20 can also have coding means in the form of geometric projections which interact with corresponding recesses in the shielding housing part 12 in such a way that incorrect fitting is precluded. Second connection elements 6 are provided on that side of the shielding housing part 12 which is averted from the high-voltage current cable, said second connection elements substantially having a second insulating housing part 42, said second connection elements and second insulating housing part being connected to one another in this case by a connecting piece 44. A second contact element 46 which is designed as a current line element in the present case is provided in the second insulating housing part 42 in a known manner. In this case too, the second connection element 6 has holes 48 through which the screws 10 extend and engage with corresponding threaded holes 50. A ring contact element 52 which is part of a weak-current contact arrangement 53, which is illustrated in FIG. 3 in particular, is now inserted into the respective shock protection means 39. The weak-current contact arrangement 53 is intended to ensure that the connecting apparatus of the first connection element 4 is completely and securely produced with the second connection element 6, before a control path (not illustrated any further) allows high current to flow across the first connection element 4 and the second connection element 6.

Figure 2:
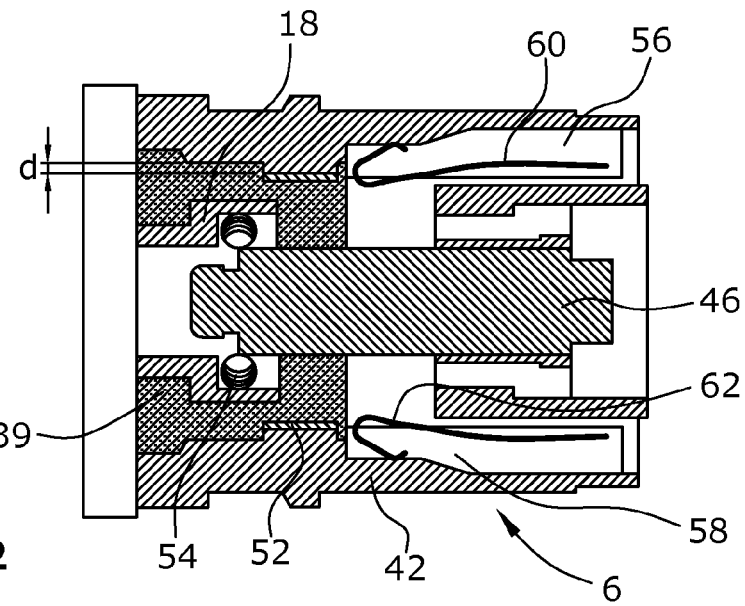
FIG. 2 shows a sectional view of the connecting apparatus from FIG. 1 in the region of a first and a second connection element, said connection elements being in the unconnected state.
Figure 3:
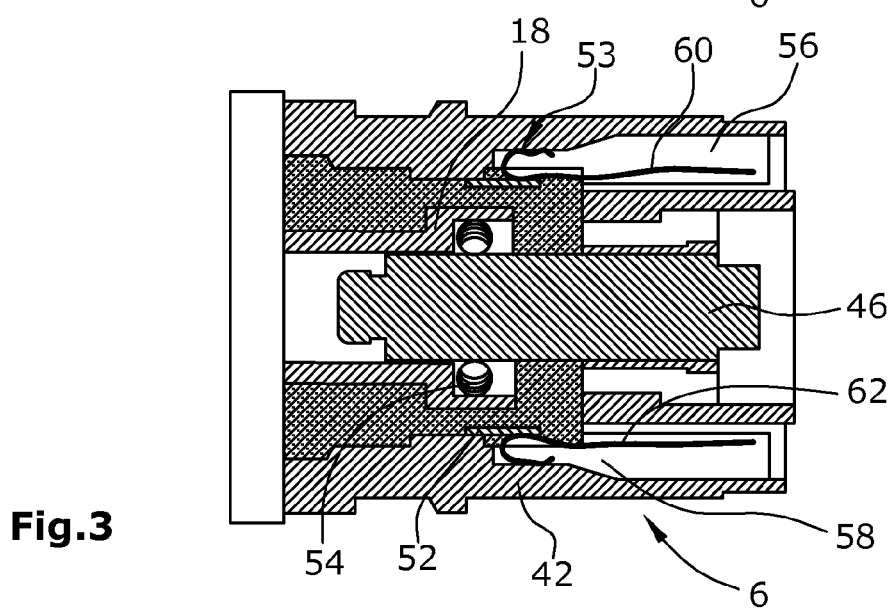
FIG. 3 shows a sectional view of the connecting apparatus from FIG. 1 in the region of the first and the second connection element in the contact-connected state.

FIG. 2 shows a sectional view through a second connection element 6 with the second contact element 46, which second contact element is in contact with the first contact element 18 of the first connection element 6 (not illustrated any further here). In this case, the first contact element 18 has, as is known, a current spring element 54 by means of which the current connection is reliably produced. Also shown is the shock protection means 39 into which the ring contact element 52 is inserted at a radial distance d from the outside diameter of the shock protection means 39.

Furthermore, two housings 56, 58 which are arranged in the second insulating housing part 42 and in which spring contact elements 60, 62 are respectively arranged are shown. Since the housings 56, 58 are already fitted in the insulating housing part 42, the spring contact elements 60, 62 for making contact with the ring contact element 52 project.

FIG. 3 now shows the two contact elements 18 and 46 in the contact-connected and latched state. In this case, the spring contact elements 60, 62 are in contact with the ring contact element 52, with the result that the control circuit is produced. In addition, the current spring element 54 is in full contact with the second contact element 46. In order to ensure that the first and second contact elements 18, 46 are fully in contact with one another, the distance between said contact elements 18, 46 is 1 mm less than the distance between the ring contact element 52 and the two spring contact elements 60, 62. The first and second contact elements therefore lead the weak-current contact-connection. Owing to this arrangement, the ring contact element 52 now also latches with the spring contact elements 60, 62. The ring contact element 52 can furthermore have a groove (not illustrated any further) in order to latch even more precisely.

Figure 4:
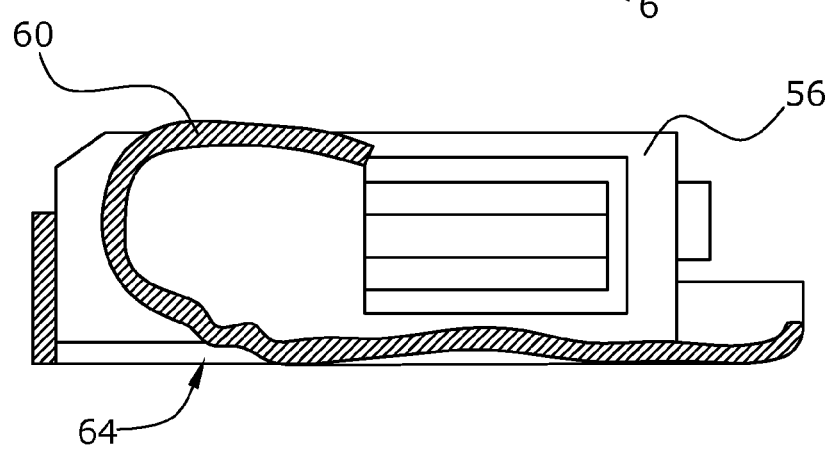
FIG. 4 shows a view of a detail of a spring contact element.

FIG. 4 shows a sectional view through the housing part 56 with the spring contact element 60, in the non-fitted state. The spring contact element 60 is completely accommodated in the housing part 56 and thereby protected against damage during transportation. In this case, the spring contact element 60 also has a specially designed contact zone 64 which can engage, in particular, for example, with a groove in the ring contact element 52. When the housing part 56 is arranged in the second insulating housing part 42, the spring contact element 60 is displaced in such a way that it is arranged so as to project in relation to the housing surface of the housing part 56.

What is claimed is:

1. A connecting apparatus for transmitting high-voltage current in the motor vehicle sector, having at least one first connection element (4), at least one second connection element (6), at least one shielding housing part (12) and fasteners (8, 10), wherein the first connection element (4) has at least one housing arrangement (20) having a first insulating housing part (21) with at least one first contact element (18) that is electrically connected to an internal conductor (16) of a cable (14), and has a shielding arrangement (28) that is connected to a shield (30) of the cable (14), wherein: the shielding arrangement (28) is connected to the shielding housing part (12) by a shielding part (32), the second connection element (6) has at least one second housing arrangement (41) having a second insulating housing part (42) with at least one second contact element (46) connected to a current line element, and a weak-current contact arrangement for creating a control circuit is provided, the weak-current contact arrangement (53) having a ring contact element (52) and two spring contact elements (60, 62).

2. The connecting apparatus of claim 1, wherein the ring contact element is inserted into a shock protection means (39) at a radial distance d from the outside diameter of the shock protection means (39).

3. The connecting apparatus of claim 1, wherein the ring contact element (52) has a groove.

4. The connecting apparatus of claim 1, wherein the respective spring contact element (60, 62) has a contact zone (64) directed in a direction of the ring contact element (52).

5. The connecting apparatus of claim 1, wherein the first insulating housing part (21) is produced from plastic and is connected to the shielding housing part (12) by removable fasteners (8).

6. The connecting apparatus of claim 1, wherein the second insulating housing part (42) is produced from plastic and is connected to the shielding housing part (12) by removable fasteners (10).

7. The connecting apparatus of claim 1, wherein the first contact element (18) is a socket, and the second contact element (46) is a pin.

8. The connecting apparatus of claim 7, wherein the first contact element (18) has a current spring element (54).

9. The connecting apparatus of claim 1, wherein the spring contact element (60, 62) is arranged in a housing part (56) in a displaceable manner in such a way that the spring contact element is recessed in relation to a housing surface in a non-fitted state, and projects in relation to the housing surface in the fitted state.

10. The connecting apparatus of claim 1, wherein a distance between the first and second contact elements (18, 46) is at least 1 mm less than the distance between the ring contact element (52) and the two spring contact elements (60, 62).

* * * * *